United States Patent
Pollock

(10) Patent No.: US 6,384,564 B1
(45) Date of Patent: May 7, 2002

(54) ELECTRICAL MACHINES

(75) Inventor: Charles Pollock, Leis (GB)

(73) Assignee: University of Warwick, Coventry (GB)

( * ) Notice: Subject to any disclaimer, the term of this patent is extended or adjusted under 35 U.S.C. 154(b) by 0 days.

(21) Appl. No.: 09/598,104

(22) Filed: Jun. 21, 2000

(30) Foreign Application Priority Data

Jun. 22, 1999 (GB) .............................................. 9914402

(51) Int. Cl.$^7$ ................................................. H02P 1/46
(52) U.S. Cl. ..................................... 318/701; 318/254
(58) Field of Search ................................ 318/138, 254, 318/700, 701

(56) References Cited

U.S. PATENT DOCUMENTS

| | | | |
|---|---|---|---|
| 4,360,770 A | 11/1982 | Ray et al. ............... | 318/701 |
| 4,387,326 A | * 6/1983 | Ray et al. ............... | 318/138 |
| 5,172,309 A | * 12/1992 | DeDoncker et al. ...... | 363/132 |
| 5,507,103 A | * 4/1996 | Merritt ................... | 34/97 |
| 5,659,233 A | 8/1997 | Nashiki ................... | 318/440 |
| 5,767,638 A | * 6/1998 | Wu et al. ................ | 318/254 |
| 5,847,532 A | * 12/1998 | Webster .................. | 318/701 |
| 6,087,799 A | 7/2000 | Turner .................... | 318/701 |
| 6,111,770 A | * 8/2000 | Peng ...................... | 363/131 |
| 6,140,729 A | * 10/2000 | Pollock et al. ........... | 310/166 |

FOREIGN PATENT DOCUMENTS

| | | |
|---|---|---|
| EP | 0 074 752 A1 | 3/1993 |
| EP | 0 608 979 A2 | 8/1994 |
| EP | 0 613 234 A1 | 8/1994 |
| EP | 0 886 370 A2 | 12/1998 |
| WO | 97/48172 | 12/1997 |
| WO | 98/01932 | 1/1998 |

OTHER PUBLICATIONS

Ray, et al.; "Switched reluctance motor drives for rail traction: a second view" *IEE Proceedings*, vol. 131, Sep. 1984.
Search Report for British Application No. 9914402.4, dated Nov. 8, 1999.
European Search Report, Application No. 0030526.4, dated Oct. 10, 2000.
Wale et al.; "Novel Converter Topologies for a Two–Phase Switched Reluctance Motor with Fully Pitched Windings"; 1996 IEEE; pp. 1798–1803.
Pollock et al.; "Load–resonant converter with zero current switching and variable output power"; *Electronics Letters*; $4_{th}$ Dec. 1997; vol. 33, No. 25, pp. 2081–2082.
Pollock et al.; "Acoustic Noise Cancellation Techniques for Switched Reluctance Drivers"; 1995 IEEE; pp. 448–455.

* cited by examiner

*Primary Examiner*—Robert E. Nappi
*Assistant Examiner*—Rina I. Duda
(74) *Attorney, Agent, or Firm*—Renner, Otto, Boisselle & Sklar

(57) ABSTRACT

A two-phase switched reluctance motor comprises a rotor without windings, a stator having windings, and an electronic control circuit for controlling the current in the windings to effect rotation of the rotor. The control circuit includes a capacitance bridge defining a floating point to which one end of each of the windings is coupled to form a resonance circuit. Switching transistors are connected to the windings and are switched in synchronism with rotation of the rotor so as to produce current pulses which are limited by the build-up of voltage at the floating point of the capacitance bridge. This ensures that the current in the windings returns naturally to zero at the end of each excitation pulse, thus providing more efficient power operation and reducing the acoustic noise of the machine.

16 Claims, 4 Drawing Sheets

ELECTRICAL MACHINES

BACKGROUND OF THE INVENTION

This invention relates to electrical machines, and is concerned more particularly, but not exclusively, with electrical motors. The invention is particularly applicable to electrical fans and pumps.

Electrical motors are commonly used for powering fans and pumps. In an application such as a hand dryer, it is particularly important that the motor should be capable of driving the fan in a power efficient manner which enables the fan to initially be driven at low speed and to then be rapidly accelerated to a high speed so that hand drying can be effected in the shortest possible time. However, this imposes particular requirements on the motor for driving the fan since the power required to drive the fan increases in proportion to the cube of the speed. Furthermore it is a requirement for such an application that the motor should be capable of driving the fan at high speed without producing excessive acoustic noise.

It is an object of the invention to provide an electrical machine exhibiting high power efficiency and low acoustic noise.

SUMMARY OF THE INVENTION

According to the present invention there is provided an electrical machine comprising a rotor without windings, a stator having a winding, and circuit means for controlling the current in the winding during rotation of the rotor, characterised in that the circuit means includes a capacitance bridge defining a variable voltage point to which one end of the winding is coupled to form a resonance circuit, and switch means coupled to the winding and switchable in synchronism with rotation of the rotor to produce cyclically varying current pulses which are caused to decay naturally by the build-up of voltage at the variable voltage point of the capacitance bridge during each cycle of excitation.

The provision of a resonance circuit, incorporating the winding and the capacitance bridge defining the variable voltage point at which the voltage varies substantially (by at least 50% of the average midpoint voltage) during each cycle of excitation, ensures that the current in the winding can return naturally to zero at the end of each excitation pulse, thus providing more efficient power operation and reducing the acoustic noise of the machine. Such reduction in the acoustic noise level is caused by a decrease in the sharp voltage transients across the winding, such transients being one of the dominant causes of acoustic noise.

BRIEF DESCRIPTION OF THE DRAWINGS

In order that the invention may be more fully understood, reference will now be made, by way of example, to the accompanying drawings, in which.

DETAILED DESCRIPTION OF THE DRAWINGS

Figure 1A:
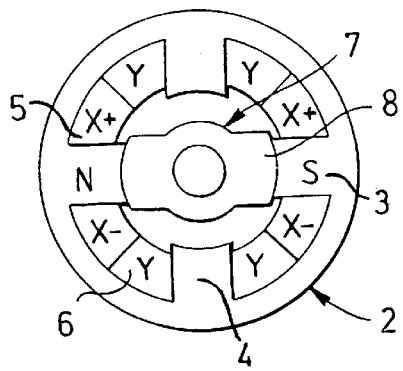
FIGS. 1a and 1b are explanatory diagrams showing the windings of a conventional two-phase variable reluctance motor.
Figure 1B:
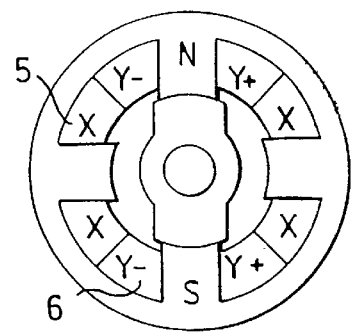

FIGS. 1a and 1b diagrammatically show a conventional two-phase variable reluctance motor comprising a stator 2 having two pairs 3,4 of oppositely disposed inwardly directed salient poles provided with two pairs 5, 6 of energising windings corresponding to the two phases, and a rotor 7 having a single pair 8 of oppositely disposed outwardly directed salient poles without windings. Each of the four energising windings is wound about its corresponding pole, as indicated by the symbols Y—Y denoting two diametrically opposite portions of each winding of the winding pair 6 and the symbols X—X denoting two diametrically opposite portions of each winding of the winding pair 5. An excitation circuit (not shown) is provided for rotating the rotor 7 within the stator 2 by energising the stator windings in synchronism with rotation of the rotor so that torque is developed by the tendency of the rotor 7 to arrange itself in a position of minimum reluctance within the magnetic field produced by the windings, as will be described in more detail below. Such a variable reluctance motor offers the advantage over a conventional wound rotor motor that a commutator and brushes, which are wearing parts, are not required for supply of current to the rotor. Furthermore the fact that there are no conductors on the rotor and that high-cost permanent magnets are not required provides other advantages.

The symbols + and − in FIGS. 1a and 1b show the directions of current flow in the windings in the two modes of excitation in which the rotor 7 is attracted either to the horizontal position or to the vertical position as viewed in the figure. It will be appreciated that rotation of the rotor 7 requires alternate energisation of the winding pairs 5 and 6, preferably with only one winding pair 5 or 6 being energised at a time, and with the current usually being supplied to each winding pair 5 or 6 in one direction during such energisation. However the windings can only be energised for a maximum of half the time per revolution if useful torque is to be produced.

Various circuit arrangements are known for supplying current to such motors. EP 0613234 A1 discloses a circuit arrangement comprising two capacitors which are specifically chosen so as to split the voltage of the dc bus equally, resistors being provided to prevent the build up of charge on either of the capacitors. EP 0886370 A2 discloses a similar circuit arrangement comprising two capacitors which split the voltage equally. In this arrangement it is necessary to monitor the midpoint voltage of the capacitors to prevent long term drift of the midpoint voltage. Furthermore it is advantageous in this case for the two phases to conduct simultaneously so that the capacitor voltages are maintained at approximately equal values. In neither of these circuit arrangements, nor in other prior circuit arrangements such as those of EP 0608979 A2, EP 0074752 A1, WO 98/01932 A1, WO 97/48172 A1, U.S. Pat. No. 5,659,233, U.S. Pat. No. 4,360,770, does the midpoint voltage vary substantially during excitation in order to limit the current supplied to the winding as described below with reference to embodiments of the present invention.

Figure 2:
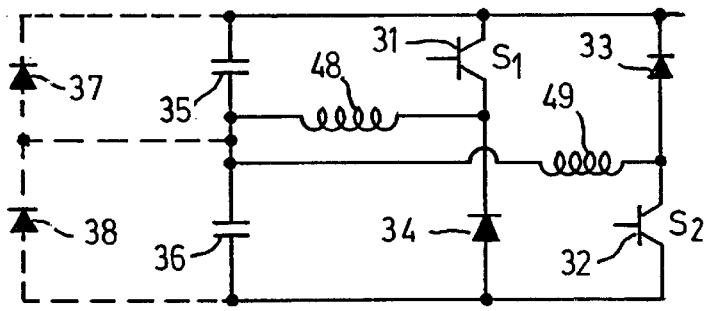
FIG. 2 is a circuit diagram of a circuit arrangement in accordance with the invention for energising the armature coils of such a motor.

FIG. 2 shows a circuit implementation in accordance with the invention for supplying a two-phase switched reluctance motor having two phase windings 48 and 49 (which are not closely coupled) corresponding to the two phases. The motor may be incorporated in an electrical fan or pump, for example, as represented by FIG. 2. Each phase winding 48 or 49 is connected to the node between a respective one of the switching transistors 31 or 32 and a respective one of the freewheeling diodes 33 or 34 so that the windings 48 and 49 are excited at different times in the operating cycle. Furthermore the windings 48 and 49 are connected at their opposite ends in common to the variable voltage floating point between the capacitors 35 and 36 such that, during current supply to one of the windings, the capacitor 35 is discharged and the capacitor 36 is charged and, during supply of current to the other winding, the capacitor 36 is discharged and the capacitor 35 is charged. As shown in broken lines diodes 37 and 38 can be added and are particularly beneficial at low motor speeds.

In operation the transistors 31 and 32 are switched alternately by the switching control circuit which is of type well-known in the motor art so that this circuit will not be described in this specification. When the transistor 31 is turned on, the voltage across the capacitor 35 is applied across the winding 48 and current flows through the winding 48 to the node between the capacitors 35 and 36. This results in the voltage across the capacitor 35 reducing and the voltage across the capacitor 36 increasing due to the resonant nature of the circuit until the voltage across the capacitor 35 eventually reaches zero at which time the current is already decreasing towards zero. The optional diode 37 provides a path for the conduction of any remaining current, thus preventing the voltage across the capacitor 35 from becoming negative. When the transistor 32 is turned on the voltage across the capacitor 36 is applied across the winding 49 and current flows through the winding 49 to the node between the capacitors 35 and 36. This results in the voltage across the capacitor 35 increasing and the voltage across the capacitor 36 decreasing until the voltage across the capacitor 36 eventually reaches zero at which time the current is already decreasing towards zero. The optional diode 38 provides a path for the conduction of any remaining current, thus preventing the voltage across the capacitor 36 from becoming negative. Thus, at low speed, current pulses are supplied to the windings 48 and 49 which are substantially half sinusoidal sections with the current returning naturally towards zero at the end of each current pulse. Since the power available increases (with increasing frequency of these pulses) in a similar manner to the resonant characteristic of the circuit, such circuit is well suited to driving of a fan-type load where the power required to drive the fan increases in proportion to the cube of the speed. Furthermore such operation reduces the sharp voltage transient across a phase winding which is one of the dominant causes of acoustic noise.

A fully pitched two-phase variable reluctance motor, as described by J. D. Wale and C. Pollock, "Novel Converter Topologies for a Two-Phase Switched Reluctance Motor with Fully Pitched Windings", IEEE Power Electronics Specialists Conference, Braveno, June 1996, pp. 1798–1803, is shown diagrammaticaly in FIGS. 3a and 3b (in which the same reference numerals are used to denote like parts as in FIGS. 1a and 1b). In this case the stator 2 comprises two windings 10 and 11 having a pitch which is twice the tooth pitch of the motor, that is 180° in the example illustrated, and disposed at 90° to one another. The winding 11 may be wound so that one part of the winding on one side of the rotor 7 fills a stator slot 12 defined between adjacent poles of the pole pairs 3, 4, and another part of the winding 11 on the diametrically opposite side of the rotor 7 fills a stator slot 13 defined between two further adjacent poles of the pole pairs 3, 4. The winding 10 has corresponding parts filling diametrically opposed stator slots 14 and 15. Thus the two windings 10 and 11 span the width of the motor with the axes of the windings 10, 11 being at right angles to one another.

Figure 3A:
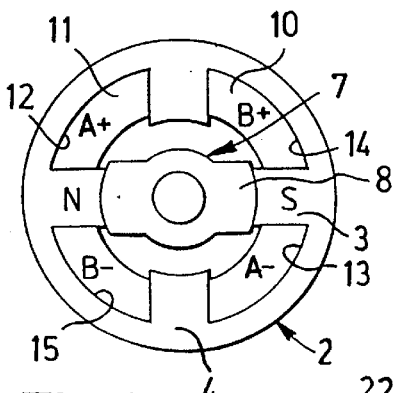
FIGS. 3a and 3b are explanatory diagrams showing the windings of a fully pitched two-phase variable reluctance motor.
Figure 3B:
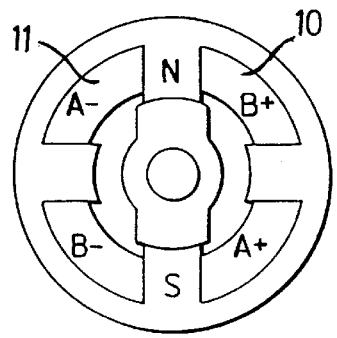

Furthermore two modes of excitation of such a motor corresponding to the horizontal and vertical positions of the rotor 7 are shown in FIGS. 3a and 3b from which it will be appreciated that both windings 10, 11 are energised in both modes of excitation, but that, whereas the direction of current flow in the winding 10 is the same in both modes, the direction of current flow in the winding 11 changes between the two modes. Since current is supplied to both phase windings 10, 11 in both modes and since each winding 10 or 11 occupies half the total stator slot area, such a system can achieve 100% utilisation of its slot area. This contrasts with the 50% utilisation achieved with the conventional wound variable reluctance motor described above in which only one phase winding is energised at a time. Furthermore, since there is no requirement for the direction of current in the winding 10 to change, the winding 10, which may be termed the field winding, can be supplied with direct current without any switching which leads to simplification of the excitation circuit used. However the winding 11, which may be termed the armature winding, must be energised with current which alternates in synchronism with the rotor position so as to determine the changing orientation of the stator flux required to attract the rotor alternately to the horizontal and vertical positions. The need to supply the armature winding with alternating current in such a motor can result in an excitation circuit of high complexity and cost.

Figure 4:
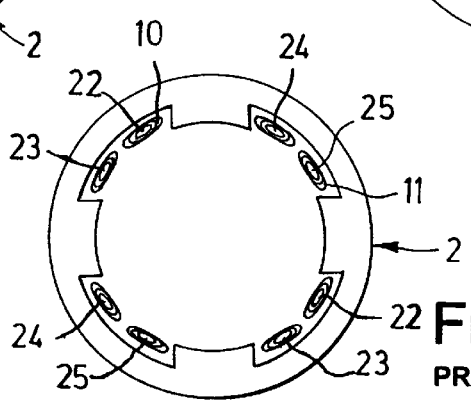
FIG. 4 is an explanatory diagram showing the windings of a two-phase variable reluctance motor as disclosed in WO 98/05112.

WO 98/05112 discloses a variant of such a fully pitched two-phase variable reluctance motor having a four-pole stator 2 which, as shown diagrammatically in FIG. 4, is provided with a field winding 10 and an armature winding 11 each of which is split into two coils 22 and 23 or 24 and 25 closely coupled and wound so that diametrically opposite portions of both coils are disposed within diametrically opposite stator slots. Switches, which may comprise field effect transistors or thyristors for example, are connected in series with the coils 24 and 25 and are switched alternately to effect alternate energisation of the coils 24 and 25 so as to provide the required magnetomotive forces acting in opposite directions.

The following description of further embodiments of the invention is given with reference to a flux-switching machine having a field flux source and an armature winding requiring bidirectional excitation current. However it should be noted that the invention is applicable to other types of electrical machine, whether in the form of an electrical motor or an electrical generator, for example a single phase synchronous machine having an armature winding requiring bidirectional excitation current.

Figure 5:
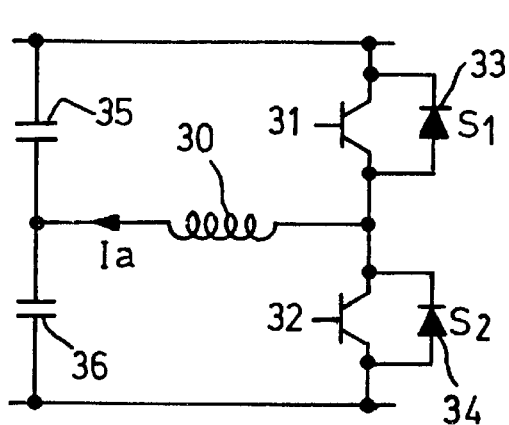
FIGS. 5 to 9, 12 and 13 are circuit diagrams illustrating various further circuit arrangements in accordance with the invention.

FIG. 5 shows a circuit diagram of a power converter for energising the single armature winding 30 of a flux-switching motor in accordance with a second embodiment of the invention. It is assumed that the field flux source (not shown) is provided by a permanent magnet or a field winding which may be excited from a separate d.c. supply or connected directly across, or in series with, the d.c. supply of the power converter. The armature winding 30 is supplied with current by way of two switches $S_1$ and $S_2$ comprising field effect transistors 31 and 32 and integral freewheeling diodes 33 and 34 connected across the main current paths of the transistors. Furthermore the armature winding 30 is connected to the common connection point of two capacitors 35 and 36 having values such that, when the armature winding 30 is supplied with current by way of one of the transistors 31 or 32, the capacitor 35 or 36 forms a resonance circuit with the inductance of the armature winding 30 resonating at a frequency close to the maximum running frequency of the motor.

In operation the transistors 31 and 32 are switched alternately by a switching control circuit which is of a type well-known in the motor art so that this circuit will not be described in this specification. When the transistor 31 is turned on the voltage across the capacitor 35 is applied across the armature winding 30 and current flows through the armature winding 30 to the node between the capacitors 35 and 36. This results in the voltage across the capacitor 35 reducing and the voltage across the capacitor 36 increasing due to the resonant nature of the circuit until the voltage across the capacitor 35 eventually reaches zero at which time the current is already decreasing towards zero. The voltage across the capacitor 35 may become negative at this time allowing the voltage across the capacitor 36 to exceed the supply voltage. The current in the armature winding 30 will then reverse and the transistor 32 will be turned on so as to cause the voltage across the capacitor 36 to force current through the armature winding 30 in the reverse direction. The power delivered to the motor will be a function of the voltages on the capacitors 35 and 36 and the armature current frequency. This power will reach a maximum value at the resonant frequency of the circuit which should ideally be the optimum running speed of the motor. Since the power will increase in a similar manner to the resonant characteristic of the circuit, such a circuit is ideally suited to driving a fan-type load connected to the motor where the power required to drive the fan increases in proportion to the cube of the speed.

Figure 10:
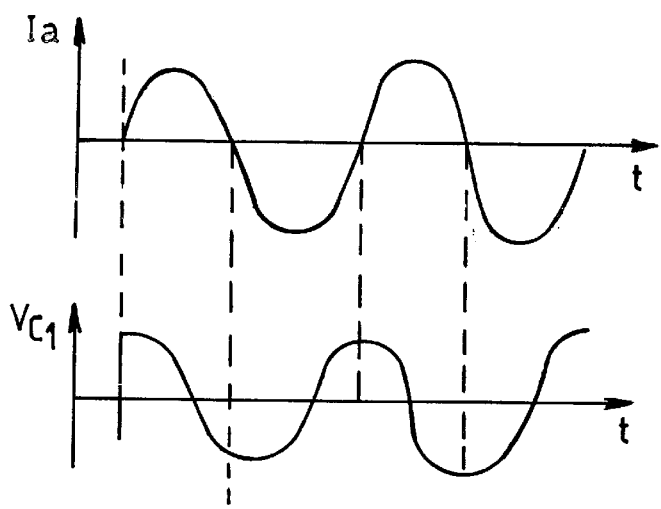
FIGS. 10 and 11 are graphs illustrating current and voltage variation in the windings of such arrangements.

FIG. 10 shows the sinusoidally varying current $I_a$ across the armature winding 30 in FIG. 5 as a function of time for the case where the motor is operating at high speed. Also shown is the varying voltage $V_{C1}$ across the capacitor 35 indicating that this voltage also varies sinusoidally with the current $I_a$ lagging the voltage $V_{C1}$.

Figure 6:
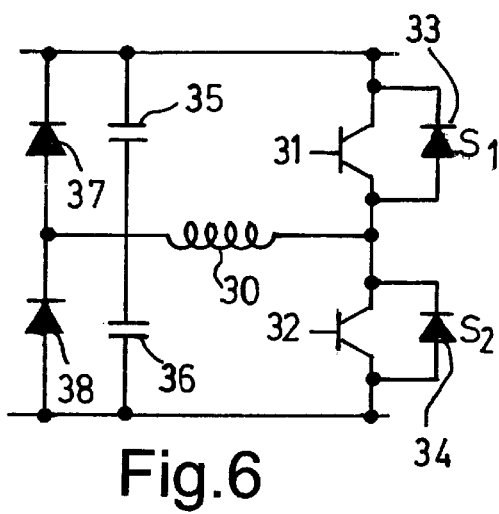
Figure 11:
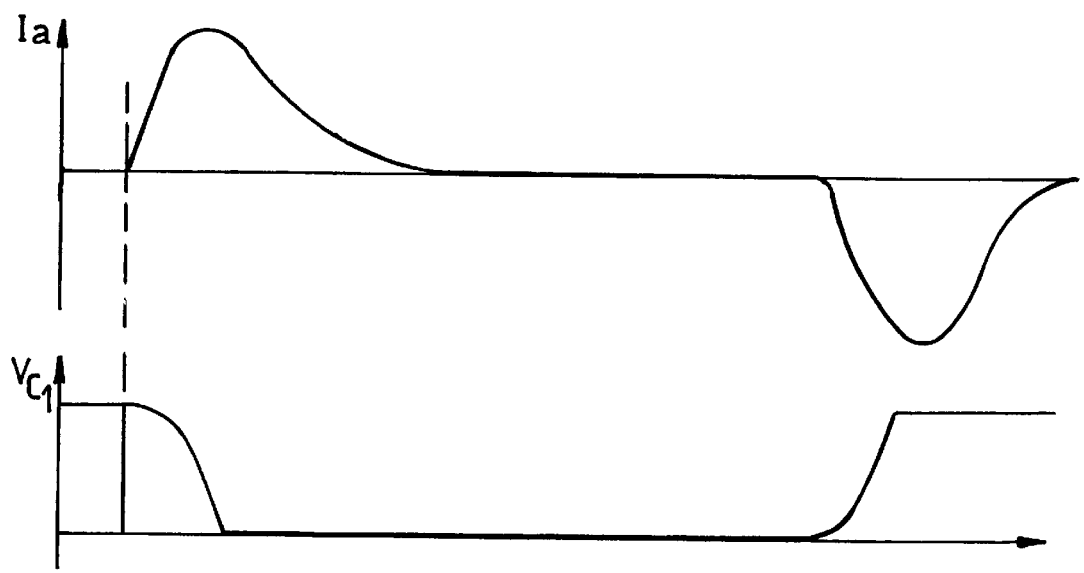

FIG. 6 shows a third embodiment of the invention which is similar to the second embodiment except that two further diodes 37 and 38 are connected in parallel with the capacitors 35 and 36. This enhancement is particularly important at low motor speeds, as shown by the graphs in FIG. 11, since it ensures that the voltage across the capacitor 35 or 36 is prevented from ever becoming negative. This is shown in FIG. 11 for the voltage $V_{C1}$ across the capacitor 35. This means that, at low speeds, the armature current $I_a$ does not reverse until the second transistor is turned on so that, as shown in FIG. 11, a short current pulse is delivered to the armature winding 30 followed by a long dead time.

Figure 7:
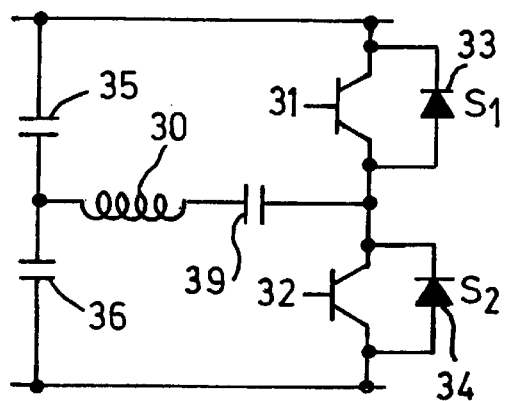
Figure 8:
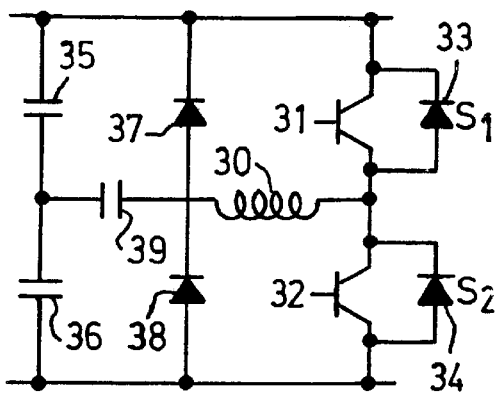

A further circuit variation in accordance with a fourth embodiment of the invention is shown in FIG. 7 and includes a resonant capacitor 39 connected in series with the armature winding 30, the capacitors 35 and 36 having substantially larger capacitances than the corresponding capacitors in the circuits of FIGS. 5 and 6 so that the voltage across the capacitors 35 and 36 does not change much during supply of current to the armature winding 30. Instead the resonant capacitor 39 in series with the armature winding 30 creates the resonant effect. The electrical performance of the circuit of FIG. 7 is similar to that of FIG. 5. Furthermore FIG. 8 shows a possible variation of this circuit by the addition of further diodes 37 and 38 so as to provide a similar enhancement in performance to that already described with reference to FIG. 6.

A further circuit enhancement, which is not shown in the drawings, is the addition of a switch to disconnect the diodes 37 and 38 from the circuit when the motor has completed initial acceleration. Such a switch could be adapted to provide two-speed control at low cost by ensuring that the switch opens momentarily to provide a short-term power boost.

Figure 9:
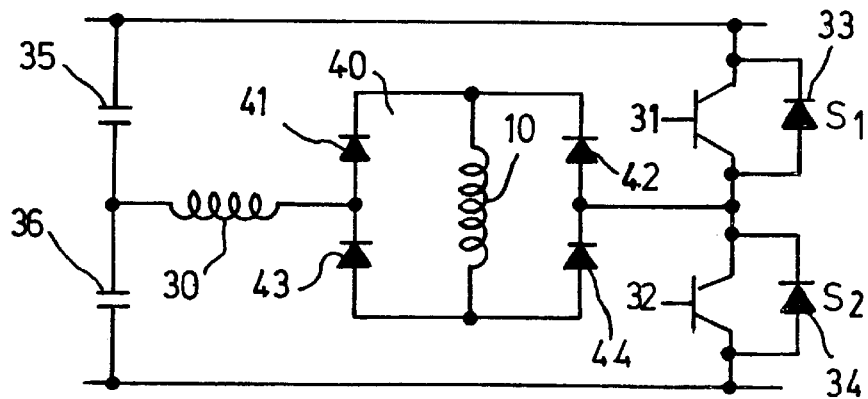

It is also possible for any of the circuits described above to be modified to supply the field winding of the motor. For example, FIG. 9 shows a circuit arrangement in which the field winding 10 is supplied with current by way of a bridge rectifier circuit 40 connected in series with the armature winding 30 and comprising four diodes 41, 42, 43 and 44 connected in a bridge configuration. Such a bridge rectifier circuit 40 ensures that the current in the field winding 10 always has the same polarity despite reversal of the armature current.

Figure 12:
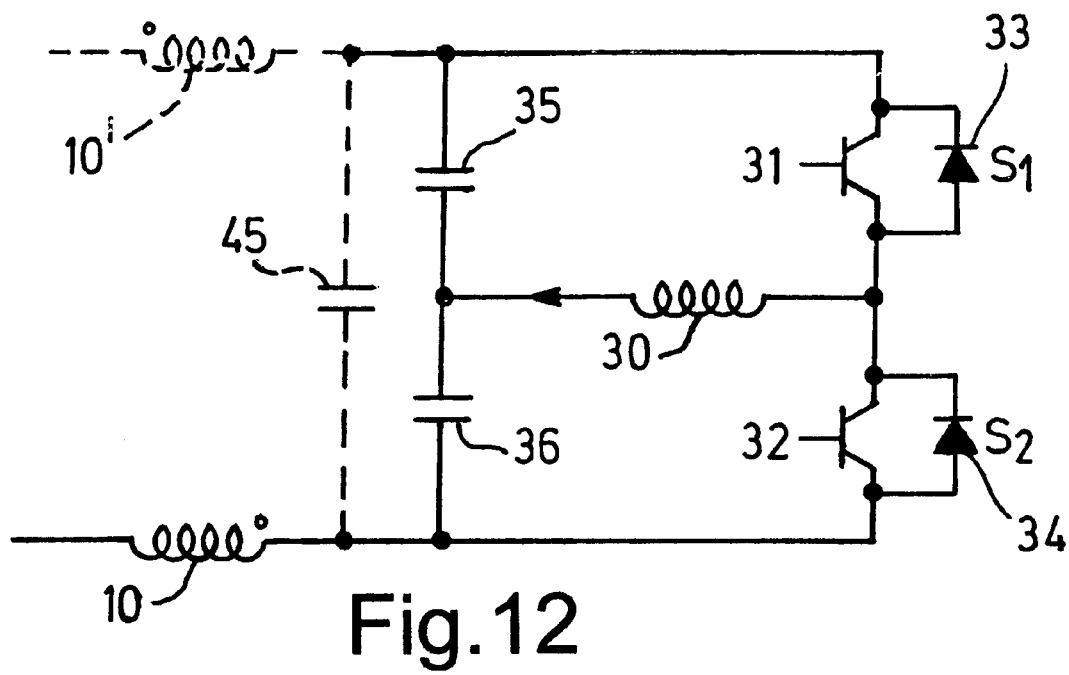

FIG. 12 shows an alternative circuit arrangement in which the field winding 10 is shown in series with the capacitors 35 and 36, being placed in the negative return supply (or alternatively in the positive incoming supply as shown in broken lines at 10'). In this case an additional capacitor, as shown in broken lines at 45, may be required to prevent secondary resonance between the field winding and the resonant capacitors 35 and 36.

Figure 13:
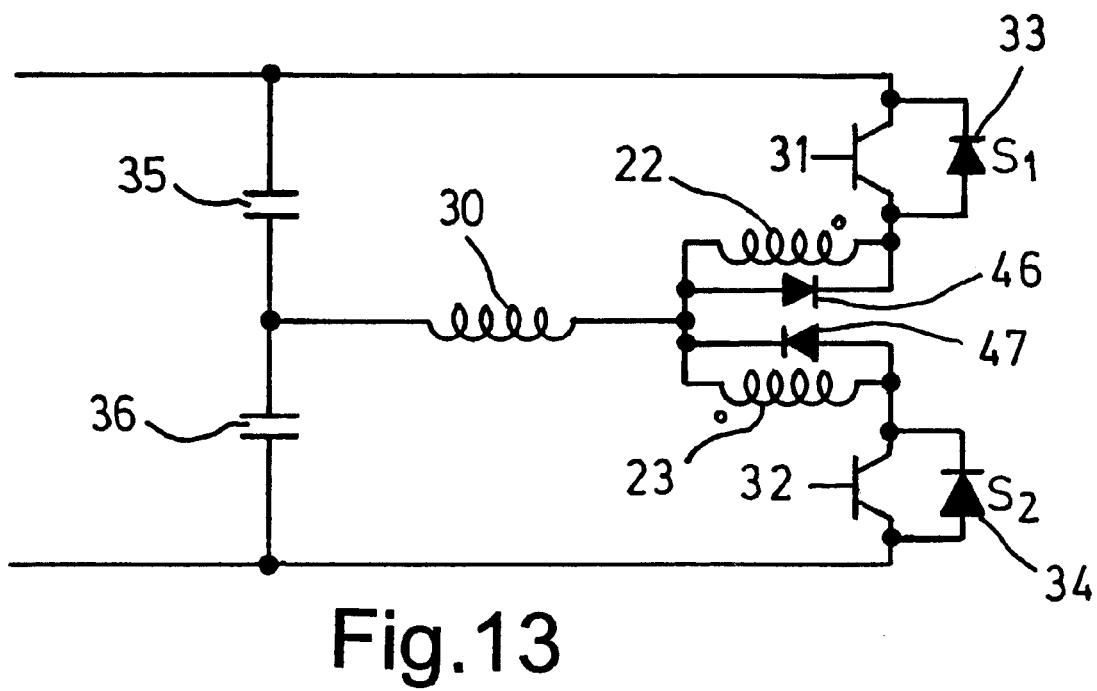

FIG. 13 shows a further circuit arrangement for supplying the field winding where this is split into two closely coupled coils 22 and 23. In this case each coil 22 or 23 is placed in series with one of the switches $S_1$ or $S_2$ so that current passes through the coil in only one direction but the overall armature current is bidirectional. A freewheeling diode 46 or 47 is provided in parallel with each coil 22 or 23.

The above described embodiments are advantageous in that the current pulses in the motor windings consist of half sinusoidal sections, and the current naturally returns close to zero at the end of each current pulse by which time the voltage across the phase winding is also zero or even negative in some cases. Such operation reduces the sharp voltage transient across a phase winding which is one of the dominant causes of acoustic noise. The circuits described above are therefore appropriate for reducing the acoustic noise emitted by such machines. Such embodiments are particularly suited to fan drives due to their power limitations at low speed and the acoustic noise benefits.

What is claimed is:

1. An electrical machine comprising a rotor (7) without windings, a stator (2) having a winding (11, 30, 48, 49), and circuit means for controlling the current in the winding (11, 30, 48, 49) during rotation of the rotor, characterised in that the circuit means includes a capacitance bridge (35, 36, 39) defining a variable voltage point to which one end of the winding (11, 30, 48, 49) is directly coupled to form a resonance circuit, and switch means (31, 32) coupled to the winding and switchable in synchronism with rotation of the rotor to produce cyclically varying current pulses which are caused to decay naturally by the build-up of voltage at the variable voltage point of the capacitance bridge (35, 36, 39) during each cycle of excitation.

2. A machine according to claim 1, wherein the circuit means comprises respective switch means (31, 32) producing current pulses of one polarity and current pulses of the opposite polarity in the winding (11, 30, 48, 49).

3. A machine according to claim 2, wherein the capacitance bridge (35, 36, 39) comprises a respective capacitance (35, 36) in the current path associated with the winding controlled by each switch means (31, 32).

4. A machine according to claim 3, wherein the two capacitances comprise two capacitors (35, 36) coupled in series between respective supply rails and defining the variable voltage point therebetween, the capacitance values of the capacitors (35, 36) being such that the voltage at the variable voltage point varies substantially during each cycle of excitation to limit the current supplied to the winding during each cycle.

5. A machine according to claim 2, wherein the capacitance bridge (35, 36, 39) comprises a respective relatively large capacitance (35, 36) in the current path associated with the winding current controlled by each switch means (31, 32), and a further relatively small capacitance (39) disposed in both such current paths and defining the variable voltage point at its connection to said one end of the winding.

6. A machine according to claim 3, wherein respective diode means (37, 38) is coupled in parallel with each of the two capacitances (35, 36).

7. A machine according to claim 2, wherein each switch means comprises a transistor (31, 32) and an associated freewheeling diode (33,34) connected so that, on turning off one of the transistors, current flows by way of the freewheeling diode associated with the other transistor.

8. A machine according to claim 1, having two or more phases, wherein the winding comprises respective coils (48, 49) corresponding to different phases, and the circuit means comprises respective switch means (31, 32) for supplying current to the coils (48, 49).

9. A machine according to claim 1, wherein the stator includes field magnet means (10, 10') for generating a magnetomotive force in a direction extending transversely of the magnetomotive force generated by the winding (11, 30, 48, 49).

10. A machine according to claim 1, wherein the field magnet means (10, 10') includes a field winding supplied with unidirectional current by the circuit means.

11. A machine according to claim 10, wherein the field winding (10) is supplied with current by way of a bridge rectifier circuit (40) in series with the first-mentioned winding (11, 30, 48, 49).

12. A machine according to claim 10, wherein the field winding (10) comprises two closely coupled field coils (22, 23) one of which is supplied with current of one polarity and the other of which is supplied with current of the opposite polarity.

13. An electrical fan or pump incorporating an electrical machine according to claim 1.

14. An electrical machine comprising a rotor (7) without windings, a stator (2) having a winding (11, 30, 48, 49), and circuit means for controlling the current in the winding (11, 30, 48, 49) during rotation of the rotor, characterised in that the circuit means includes a capacitance bridge (35, 36, 39) defining a variable voltage point to which one end of the winding (11, 30, 48, 49) is coupled to form a resonance circuit, and switch means (31, 32) coupled to the winding and switchable in synchronism with rotation of the rotor to produce cyclically varying current pulses which are caused to decay naturally by the build-up of voltage at the variable voltage point of the capacitance bridge (35, 36, 39) during each cycle of excitation, wherein the circuit means comprises respective switch means (31, 32) producing current pulses of one polarity and current pulses of the opposite polarity in the winding (11, 30, 48, 49), and wherein the capacitance bridge (35, 36, 39) comprises a respective relatively large capacitance (35, 36) in the current path associated with the winding current controlled by each switch means (31, 32), and a further relatively small capacitance (39) disposed in both such current paths and defining the variable voltage point at its connection to said one end of the winding.

15. An electrical machine comprising a rotor (7) without windings, a stator (2) having a winding (11, 30, 48, 49), and circuit means for controlling the current in the winding (11, 30, 48, 49) during rotation of the rotor, characterised in that the circuit means includes a capacitance bridge (35, 36, 39) defining a variable voltage point to which one end of the winding (11, 30, 48, 49) is coupled to form a resonance circuit, and switch means (31, 32) coupled to the winding and switchable in synchronism with rotation of the rotor to produce cyclically varying current pulses which are caused to decay naturally by the build-up of voltage at the variable voltage point of the capacitance bridge (35, 36, 39) during each cycle of excitation, wherein the circuit means comprises respective switch means (31, 32) producing current pulses of one polarity and current pulses of the opposite polarity in the winding (11, 30, 48, 49), wherein the capacitance bridge (35, 36, 39) comprises a respective capacitance (35, 36) in the current path associated with the winding controlled by each switch means (31, 32), and wherein respective diode means (37, 38) is coupled in parallel with each of the two capacitances (35, 36).

16. An electrical machine comprising a rotor (7) without windings, a stator (2) having a winding (11, 30, 48, 49), and circuit means for controlling the current in the winding (11, 30, 48, 49) during rotation of the rotor, characterised in that the circuit means includes a capacitance bridge (35, 36, 39) defining a variable voltage point to which one end of the winding (11, 30, 48, 49) is coupled to form a resonance circuit, and switch means (31, 32) coupled to the winding and switchable in synchronism with rotation of the rotor to produce cyclically varying current pulses which are caused to decay naturally by the build-up of voltage at the variable voltage point of the capacitance bridge (35, 36, 39) during each cycle of excitation, wherein the field magnet means (10, 10') includes a field winding supplied with unidirectional current by the circuit means, and wherein the field winding (10) is supplied with current by way of a bridge rectifier circuit (40) in series with the first-mentioned winding (11, 30, 48, 49).

* * * * *